(12) United States Patent
Kordt

(10) Patent No.: US 9,606,019 B2
(45) Date of Patent: Mar. 28, 2017

(54) WIND TUNNEL BALANCE AND SYSTEM WITH WING MODEL AND WIND TUNNEL BALANCE

(71) Applicant: Airbus Operations (GmbH, Hamburg (DE)

(72) Inventor: Michael Kordt, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 225 days.

(21) Appl. No.: 14/326,885

(22) Filed: Jul. 9, 2014

(65) Prior Publication Data

US 2015/0013445 A1 Jan. 15, 2015

(30) Foreign Application Priority Data

Jul. 12, 2013 (DE) .................. 10 2013 213 675

(51) Int. Cl.
| | |
|---|---|
| *G01M 9/00* | (2006.01) |
| *G01M 9/04* | (2006.01) |
| *G01M 9/06* | (2006.01) |
| *G01L 5/16* | (2006.01) |

(52) U.S. Cl.
CPC .............. *G01M 9/04* (2013.01); *G01L 5/162* (2013.01); *G01M 9/062* (2013.01)

(58) Field of Classification Search
CPC .......... G01M 9/062; G01M 9/04; G01M 9/06; G01P 5/14; G01P 5/165; G01P 13/025; B64D 43/02

USPC ............................................... 73/143, 170.02
See application file for complete search history.

(56) References Cited

U.S. PATENT DOCUMENTS

| | | | |
|---|---|---|---|
| 2,582,814 A | 1/1952 | Beman et al. | |
| 4,019,375 A | 4/1977 | Ellis et al. | |
| 4,107,986 A | 8/1978 | Jones | |
| 5,644,075 A * | 7/1997 | Hefer ................... | G01M 9/062 73/147 |
| 5,663,497 A | 9/1997 | Mole | |
| 2005/0188759 A1 | 9/2005 | Omotani | |
| 2010/0312497 A1 | 12/2010 | Jenaro Rabadan et al. | |

* cited by examiner

*Primary Examiner* — Walter L Lindsay, Jr.
*Assistant Examiner* — Ruth Labombard
(74) *Attorney, Agent, or Firm* — Greer, Burns & Crain Ltd.

(57) ABSTRACT

A wind tunnel balance, with a tunnel wall adaptor configured to fasten the wind tunnel balance to a wall of a wind tunnel, an actuator housing connected to the tunnel wall adaptor, a plurality of force sensors arranged between the actuator housing and the tunnel wall adaptor and which are configured to detect forces acting on the actuator housing, a pivot coupling, by means of which an airfoil model of an aircraft can be pivotably coupled to the actuator housing, and a plurality of piezoelectric actuators arranged in the actuator housing and which are configured to controllably deflect an airfoil model mounted on the pivot coupling in three spatial directions.

17 Claims, 3 Drawing Sheets

WIND TUNNEL BALANCE AND SYSTEM WITH WING MODEL AND WIND TUNNEL BALANCE

CROSS-REFERENCES TO RELATED APPLICATIONS

This application claims benefit of and priority to the German Patent Application No. 10 2013 213 675.7, filed Jul. 12, 2013, the entire disclosure of which is incorporated herein by way of reference.

BACKGROUND OF THE INVENTION

The present invention relates to a wind tunnel balance and a system with a wing model mounted on a wind tunnel balance, in particular for use in a cryogenic wind tunnel for measuring critical aeroelastic models at high Reynolds numbers in the supersonic range.

Dynamic wind tunnel experiments with elastic wing models are mainly carried out at Reynolds numbers, which, for example, are an order of magnitude below the Reynolds numbers actually occurring at cruising flight speeds of large aircraft. The significance of experiments of this type is therefore limited.

Experiments at high Reynolds numbers have previously been difficult to carry out since, in particular, there is a lack of precise, stable wing attachments working at high frequency, so-called wind tunnel balances. Using a 6-component wind tunnel balance, three forces along axes that are orthogonal to one another and three moments about these axes can be measured. The wind tunnel balance keeps the wing model steady, the forces acting from outside on the wing model being counteracted by corresponding counterforces which can then be measured.

The document EP 0 340 316 A1 discloses, for example, a 6-component wind tunnel balance having a loading device, by means of which loading forces in three axes perpendicular to one another and moments about these axes can be applied to a test model. The document U.S. Pat. No. 5,663,497 A discloses a 6-component wind tunnel balance for measuring forces and moments on an aircraft model in a wind tunnel.

However, there is a need for wind tunnel balances, with which critical aeroelastic models can be mapped, which combine actuators and sensors in a housing, which are configured for cryogenic experimentation surroundings and with which wing models can be tested in the range of high Reynolds numbers.

SUMMARY OF THE INVENTION

According to a first aspect, a wind tunnel balance is therefore provided, with a tunnel wall adaptor, which is configured to fasten the wind tunnel balance to a wall of a wind tunnel, an actuator housing, which is connected to the tunnel wall adaptor, a plurality of force sensors which are arranged between the actuator housing and the tunnel wall adaptor and which are configured to detect forces acting on the actuator housing, a pivot coupling, by means of which an airfoil model of an aircraft can be pivotably coupled to the actuator housing, and a plurality of piezoelectric actuators, which are arranged in the actuator housing and which are configured to controllably deflect an airfoil model mounted on the pivot coupling in three spatial directions.

Furthermore, according to a second aspect, a system with a wind tunnel balance according to the invention, in accordance with the first aspect, and with an airfoil model of an aircraft rotatably and tiltably mounted on the wind tunnel balance is provided.

According to one embodiment of the wind tunnel balance, the force sensors may have piezoelectric force sensors, which are clamped under preloading with preloading bolts between the actuator housing and the tunnel wall adaptor. As a result, the dynamic measuring range of the force sensors is advantageously improved.

According to a further embodiment of the wind tunnel balance, the piezoelectric actuators may be configured to produce deflections of the airfoil model with an excitation frequency of more than 100 Hz. This is, in particular, advantageous for carrying out aeroelastic experiments in the supersonic regime of high Reynolds numbers, which correspond to realistic flow conditions at cruising flight speeds of large aircraft.

According to a further embodiment of the wind tunnel balance, the number of piezoelectric actuators may be at least four, which are configured to input moments about the three spatial directions into the airfoil model. This makes it possible to advantageously take into account at least six degrees of freedom when inputting excitations into the airfoil model.

According to a further embodiment of the wind tunnel balance, the piezoelectric actuators may be arranged within the actuator housing in such a way that when one of the piezoelectric actuators fails, the airfoil model still remains deflectable by the remaining piezoelectric actuators in three spatial directions. As a result, the redundancy of the actuators is ensured. In particular, it is advantageous in a wind tunnel in experiments that are complex to prepare under cryogenic conditions not to have to interrupt an experiment for maintenance and repair work in order to replace or repair an actuator that has failed. With a redundant configuration of the wind tunnel balance, the experiment can be continued without restrictions even if an actuator fails.

According to a further embodiment of the wind tunnel balance, the pivot coupling may have force transmission elements and connecting blocks, by means of which one of the piezoelectric actuators in each case can be connected to a retaining strip of the airfoil model.

According to a further embodiment of the wind tunnel balance, the actuator housing may be substantially cylindrical. This allows a dimensionally stable and very rigid configuration of the wind tunnel balance.

According to a further embodiment of the wind tunnel balance, the wind tunnel balance may have only natural vibration frequencies of more than 800 Hz. As a result, the wind tunnel balance is particularly stable and rigid, in particular in the range of the excitation frequencies of the airfoil model, which may be approximately between 100 Hz and 300 Hz.

According to one embodiment of the system, a plurality of pressure sensors, acceleration sensors, expansion measuring strips and/or position markers may be attached to the airfoil model.

BRIEF DESCRIPTION OF THE DRAWINGS

The invention will be described more precisely below in conjunction with and in relation to exemplary embodiments, as in the accompanying drawings.

The accompanying drawings are used for better understanding of the present invention and illustrate exemplary embodiment variants of the invention. They are used to explain principles, advantages, technical effects and variation possibilities. Other embodiments and many of the intended advantages of the invention are obviously likewise conceivable, in particular with a view to the detailed description of the invention shown below. The elements in the drawings are not necessarily shown true to scale and are shown partly simplified or schematically for reasons of clarity. The same reference numerals designate the same or similar components or elements here.

DETAILED DESCRIPTION OF THE PREFERRED EMBODIMENTS

Although special embodiments are described and shown here, it is clear to a person skilled in the art that a wealth of further, alternative and/or equivalent implementations can be selected for the embodiments, without substantially deviating from the basic idea of the present invention. In general, all variations, modifications and adaptations of the embodiments described here should also be considered to be covered by the invention.

Figure 1:
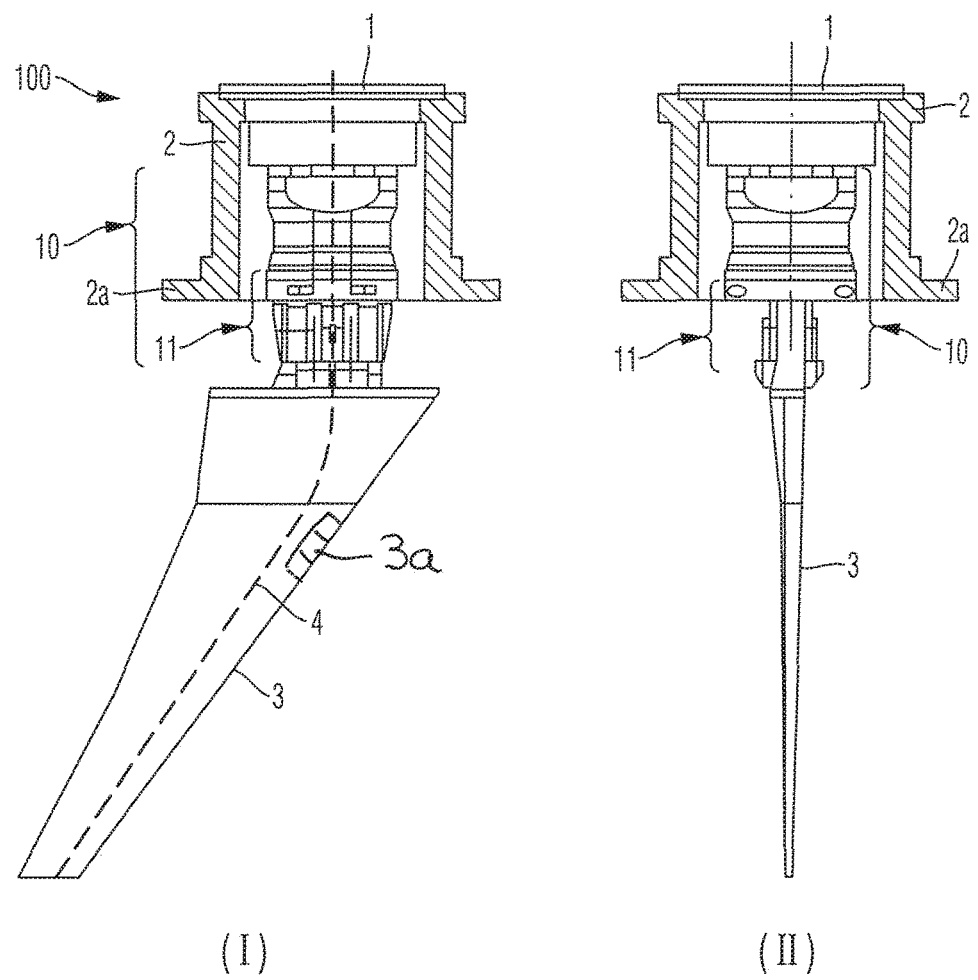
FIG. 1 shows a schematic illustration of a system with an airfoil model of an aircraft mounted on a wind tunnel balance according to one embodiment of the invention.

FIG. 1 shows a schematic illustration of a system 100 with an airfoil model 3 of an airfoil of an aircraft, which is rotatably and tiltably mounted on a wind tunnel balance 10. The system 100 may, for example, be used in a cryogenic wind tunnel, for example the European Transonic Wind Tunnel, in order to carry out experiments at low temperatures, for example in a liquid nitrogen atmosphere. The airfoil model 3 may, for example, be a HIRENASD model ("High Reynolds Number Aerostructural Dynamics"). A plurality of pressure sensors 3a, acceleration sensors, expansion measuring strips and/or position markers may be attached to the airfoil model 3 to measure aerodynamic parameters. The airfoil model 3 is simulated by a corresponding bar model 4, indicated by dashed lines here.

The airfoil model 3 is rigidly mounted on a pivot coupling of the wind tunnel balance 10. The wind tunnel balance 10, has, for this purpose, in an end region on the airfoil side, an actuator region 11, which is used to excite or input forces into the airfoil model 3. The actuator region 11 is connected by a tunnel wall adaptor to a wind tunnel adaptor 2 which rigidly connects the wind tunnel balance 10 and the airfoil model 3 to a wind tunnel wall 1 or the wind tunnel ceiling. In many wind tunnels there are special wind tunnel adaptors 2 for this purpose, which have an adaptor head 2a that can be connected to a model carriage. The model carriage is used as a protective casing for the wind tunnel balance 10 and as a transport vehicle to introduce the model into the wind tunnel.

Figure 2:
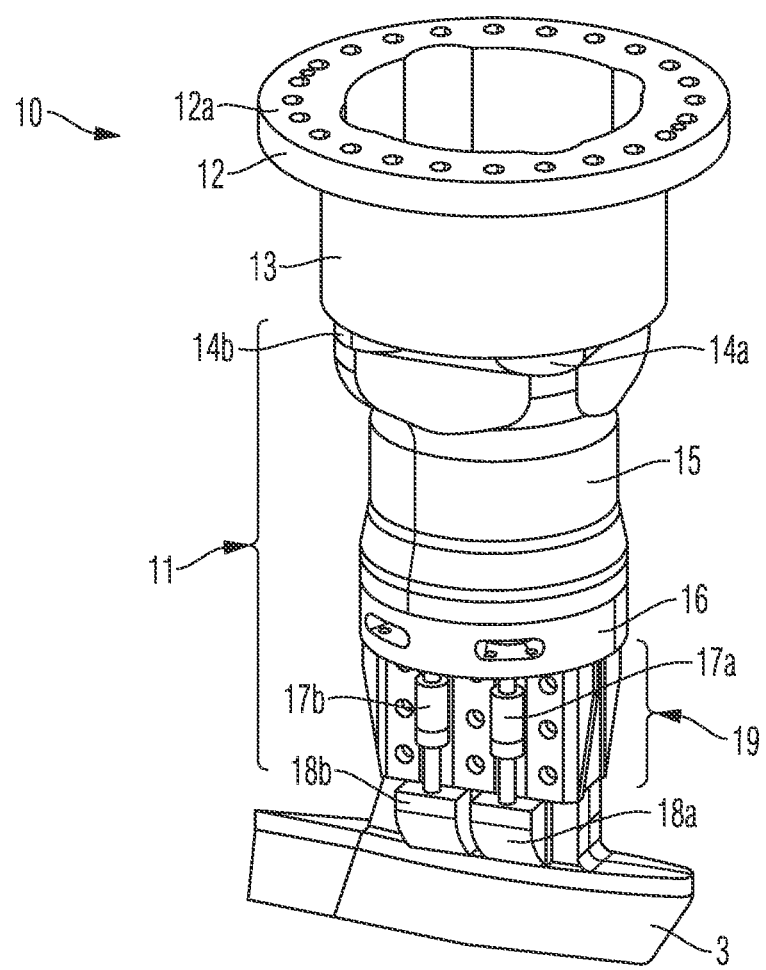
FIG. 2 shows a schematic illustration of a wind tunnel balance according to a further embodiment of the invention.
Figure 3:
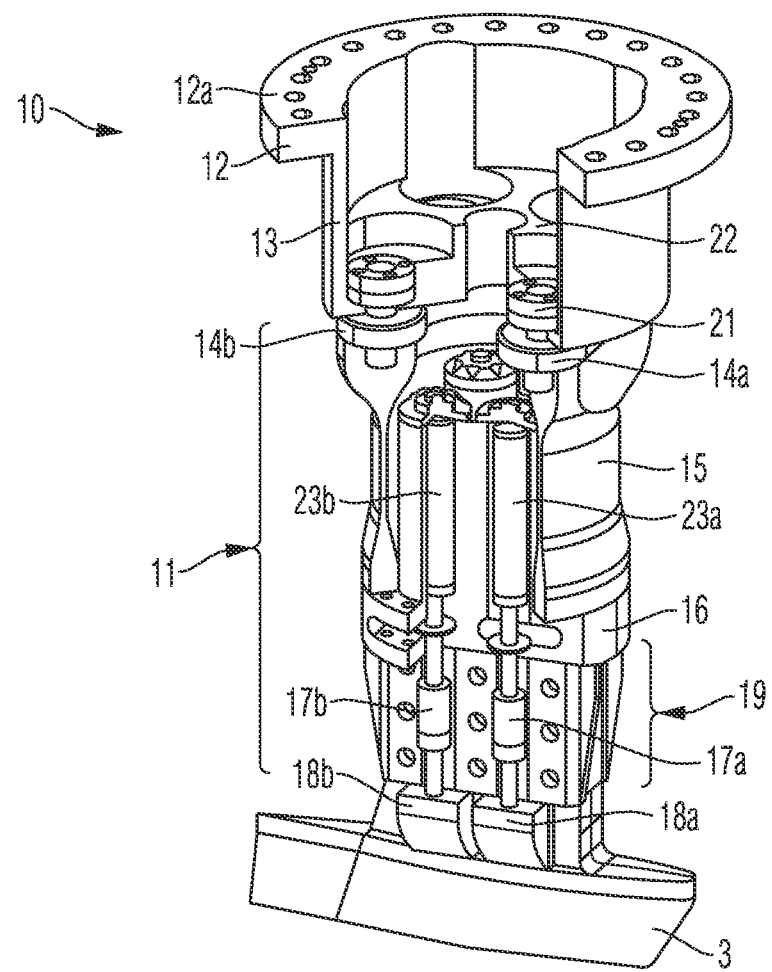
FIG. 3 shows a schematic illustration of the wind tunnel balance in FIG. 2 in a sectional view.

FIG. 2 shows a schematic illustration of a wind tunnel balance 10. For example, the wind tunnel balance 10 can be used in a system 100, as shown in FIG. 1. FIG. 3 shows a corresponding sectional view of the wind tunnel balance 10 in FIG. 2. The structure of the exemplary wind tunnel balance 10 will be described below in relation to the two FIGS. 2 and 3.

The wind tunnel balance 10 comprises a tunnel wall adaptor 13, which is configured to fasten the wind tunnel balance 10 on a wall of a wind tunnel. The tunnel wall adaptor 13 may, for example, be manufactured from steel and have a hollow cylindrical shape that, on the wall-side end, comprises a fastening flange 12 with bolt holes 12a, by means of which the tunnel wall adaptor 13 can be fastened by bolts to the tunnel wall. Configured in the interior of the tunnel wall adaptor 13 is a structured adaptor base 21, which may have corresponding recesses or set-back areas to receive fastening screws or bolts 21.

The tunnel wall adaptor 13 can be connected by the fastening screws or bolts in the adaptor base 21 to an actuator housing 15. In this case, arranged between the actuator housing 15 and the tunnel wall adaptor 12 is a plurality of force sensors 14a and 14b, which are configured to detect forces acting on the actuator housing 15. The force sensors 14a and 14b may, in this case, have piezoelectrically working force sensors, which are clamped by preloading bolts 21 between the actuator housing 15 and the tunnel wall adaptor 12. For example, the force sensors 14a and 14b can be clamped under a preloading of 300 kN, and in each case detect forces in a range between −100 kN and +100 kN.

The actuator housing 15 may be substantially cylindrical and also manufactured from steel. A plurality of piezoelectric actuators 23a or 23b, which are configured to controllably deflect an airfoil model 3 mounted on the wind tunnel balance 10 in three spatial directions, is arranged in the interior of the actuator housing 15. For this purpose, the piezoelectric actuators 23a or 23b may, for example, have high-voltage piezo stacks with a control voltage of between 0 V and 100 V, which allow a maximum deflection of 200 μm at a maximum force of 50 kN. The piezoelectric actuators 23a or 23b are arranged here along the main axis of the actuator housing 15 and can be suitably placed in the interior so the piezoelectric actuators 23a and 23b can produce deflections of the airfoil model 3 with an excitation frequency of more than 100 Hz.

The number of piezoelectric actuators 23a and 23b may be at least four, so moments about the three spatial directions can be input into the airfoil model 3. The piezoelectric actuators are arranged here within the actuator housing 15 in such a way that if one of the piezoelectric actuators 23a or 23b fails, the airfoil model 3 still remains deflectable by the remaining piezoelectric actuators 23a and 23b in three spatial directions. As shown in FIGS. 2 and 3, the piezoelectric actuators 23a or 23b are both arranged parallel to one another and coupled to the same side of the airfoil model 3. If one of the actuators fails, the respective other actuator can continue to take on the actuation of the airfoil model 3.

The number of actuators is not, however, limited to four—any other number of actuators can likewise be provided, with which the actuation of the airfoil model in three spatial directions and the input of moments about these three spatial directions remain ensured. Likewise, the number of force sensors is not limited to two. The number of force sensors can also be selected here in such a way that a sensing of forces, which act on the airfoil model in three spatial directions, and moments, which act on the airfoil model about these three spatial directions, remain ensured. The number of force sensors may preferably correspond with the number of actuators.

The wind tunnel balance 10, may have a pivot coupling 19 in the lower actuator region 11, by means of which an airfoil model 3 of an aircraft can be pivotably coupled to the actuator housing 15. For this purpose, the pivot coupling 19 may have force transmission elements 17a and 17b and connecting blocks 18a or 18b, by means of which one of the piezoelectric actuators 23a or 23b can be connected, in each case, to a retaining strip of the airfoil model 3. The force transmission elements 17a and 17b can be coupled in a resilient manner to the actuators 23a or 23b under preloading in an intermediate frame 16. Overall, the wind tunnel balance 10 is configured in such a way that it only has natural vibration frequencies above a predetermined frequency value, for example of more than 800 Hz. This ensures that the wind tunnel balance 10, even in the frequency regime which the vibrations of the airfoil model 3 have during a wind tunnel experiment, remains as rigid and stable as possible. This may be achieved, for example, in that the actuator housing 15 is configured in one piece together with the pivot coupling 19 and the actuator housing 15 is coupled under preloading to the tunnel wall adaptor 13.

The wind tunnel balance 10 is, in particular, suitable for critical aeroelastic airfoil models, which are inclined to vibrations and oscillations, and for the analysis of stationary and non-stationary experiments with a super-critical elastic airfoil model in the transonic flow region, in other words in a flow region, in which the sound velocity can be locally exceeded in the flow around the airfoil. These experiments can be carried out at high Reynolds numbers, which can simulate realistic conditions at the cruising flight speed of large aircraft.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A wind tunnel balance, comprising:
a tunnel wall adaptor configured to fasten the wind tunnel balance to a wall of a wind tunnel;
an actuator housing connected to the tunnel wall adaptor;
a plurality of force sensors arranged between the actuator housing and the tunnel wall adaptor and which are configured to detect forces acting on the actuator housing;
a pivot coupling configured to pivotably couple an airfoil model of an aircraft to the actuator housing; and
a plurality of piezoelectric actuators arranged in the actuator housing and which are configured to controllably deflect an airfoil model mounted on the pivot coupling in three spatial directions.

2. The wind tunnel balance according to claim 1, wherein the force sensors have piezoelectric force sensors clamped by preloading bolts between the actuator housing and the tunnel wall adaptor.

3. The wind tunnel balance according to claim 1, wherein the piezoelectric actuators are configured to produce deflections of the airfoil model with an excitation frequency of more than 100 Hz.

4. The wind tunnel balance according to claim 1, wherein the number of piezoelectric actuators is at least four, which are configured to input moments about the three spatial directions into the airfoil model.

5. The wind tunnel balance according to claim 4, wherein the piezoelectric actuators are arranged within the actuator housing in such a way that when one of the piezoelectric actuators fails, the airfoil model still remains deflectable by the remaining piezoelectric actuators in three spatial directions.

6. The wind tunnel balance according to claim 1, wherein the pivot coupling has force transmission elements and connecting blocks, configured to connect one of the piezoelectric actuators in each case to a retaining strip of the airfoil model.

7. The wind tunnel balance according to claim 1, wherein the actuator housing is substantially cylindrical.

8. The wind tunnel balance according to claim 1, wherein the wind tunnel balance has natural vibration frequencies of only more than 800 Hz.

9. A system, comprising:
a wind tunnel balance having a tunnel wall adaptor configured to fasten the wind tunnel balance to a wall of a wind tunnel,
an actuator housing connected to the tunnel wall adaptor,
a plurality of force sensors arranged between the actuator housing and the tunnel wall adaptor and which are configured to detect forces acting on the actuator housing, a pivot coupling, pivotably coupling an airfoil model of an aircraft to the actuator housing, and
a plurality of piezoelectric actuators arranged in the actuator housing which piezoelectric actuators are configured to controllably deflect the airfoil model rotatably and tiltably mounted on the pivot coupling in three spatial directions.

10. The system according to claim 9, wherein at least one of a plurality of pressure sensors, acceleration sensors, expansion measuring strips and position markers is attached to the airfoil model.

11. The system according to claim 9, wherein the force sensors have piezoelectric force sensors clamped by preloading bolts between the actuator housing and the tunnel wall adaptor.

12. The system according to claim 9, wherein the piezoelectric actuators are configured to produce deflections of the airfoil model with an excitation frequency of more than 100 Hz.

13. The system according to claim 9, wherein the number of piezoelectric actuators is at least four, which are configured to input moments about the three spatial directions into the airfoil model.

14. The system according to claim 13, wherein the piezoelectric actuators are arranged within the actuator housing in such a way that when one of the piezoelectric actuators fails, the airfoil model still remains deflectable by the remaining piezoelectric actuators in three spatial directions.

15. The system according to claim 9, wherein the pivot coupling has force transmission elements and connecting blocks, by means of which one of the piezoelectric actuators in each case is connected to a retaining strip of the airfoil model.

16. The system according to claim 9, wherein the actuator housing is substantially cylindrical.

17. The system according to claim 9, wherein the wind tunnel balance has natural vibration frequencies of only more than 800 Hz.

* * * * *